(12) United States Patent
Ito et al.

(10) Patent No.: US 9,771,080 B2
(45) Date of Patent: Sep. 26, 2017

(54) ROAD SURFACE GRADIENT DETECTION DEVICE

(71) Applicant: TOYOTA JIDOSHA KABUSHIKI KAISHA, Toyota-shi, Aichi (JP)

(72) Inventors: Hiroaki Ito, Susono (JP); Fumio Sugaya, Susono (JP)

(73) Assignee: TOYOTA JIDOSHA KABUSHIKI KAISHA, Aichi (JP)

(*) Notice: Subject to any disclaimer, the term of this patent is extended or adjusted under 35 U.S.C. 154(b) by 57 days.

(21) Appl. No.: 15/092,852

(22) Filed: Apr. 7, 2016

(65) Prior Publication Data
US 2016/0304098 A1 Oct. 20, 2016

(30) Foreign Application Priority Data

Apr. 17, 2015 (JP) .................................. 2015-084936

(51) Int. Cl.
*B60W 40/076* (2012.01)
*G06K 9/00* (2006.01)
*H04N 13/00* (2006.01)
*G06T 7/593* (2017.01)

(52) U.S. Cl.
CPC ....... *B60W 40/076* (2013.01); *G06K 9/00791* (2013.01); *G06K 9/00798* (2013.01); *G06T 7/593* (2017.01); *H04N 13/0007* (2013.01); *G06T 2207/10021* (2013.01); *G06T 2207/30256* (2013.01)

(58) Field of Classification Search
CPC ........... G06T 2207/10021; G06T 7/593; G06T 2207/30252; G06T 2207/10016; G06K 9/00798; G06K 9/00791; H04N 13/0203; H04N 13/0007; B60W 30/00; B60W 40/076
See application file for complete search history.

(56) References Cited

U.S. PATENT DOCUMENTS

| | | | | |
|---|---|---|---|---|
| 5,487,116 A * | 1/1996 | Nakano | ............... | G06K 9/00798 382/104 |
| 6,449,383 B1 * | 9/2002 | Oike | .................... | G05D 1/0246 340/907 |
| 6,813,370 B1 * | 11/2004 | Arai | ........................ | G06T 7/593 340/908.1 |
| 9,378,553 B2 * | 6/2016 | Tamura | .............. | G06K 9/00791 |

(Continued)

FOREIGN PATENT DOCUMENTS

JP 9-325026 A 12/1997

*Primary Examiner* — Jingge Wu
(74) *Attorney, Agent, or Firm* — Sughrue Mion, PLLC

(57) ABSTRACT

A road surface gradient detection device is provided. The road surface gradient detection device includes an image area setting unit configured to divide a captured image to set a plurality of image areas, a weighting setting unit configured to set the weighting of the pixel range, a representative height calculation unit configured to calculate the representative parallax of each image area and the representative height of each image area based on the parallax of each pixel range, the coordinates of each pixel range, and a magnitude of the weighting of each pixel range, and a road surface gradient detection unit configured to detect the road surface gradient from the captured image based on the representative parallax of each image area and the representative height of each image area.

16 Claims, 5 Drawing Sheets

(56) References Cited

U.S. PATENT DOCUMENTS

| | | | | |
|---|---|---|---|---|
| 2008/0303893 | A1* | 12/2008 | Kim | H04N 13/0022 |
| | | | | 348/42 |
| 2009/0190827 | A1* | 7/2009 | Saito | G06T 7/593 |
| | | | | 382/154 |
| 2010/0299109 | A1 | 11/2010 | Saito | |
| 2012/0207348 | A1* | 8/2012 | Saito | G08G 1/04 |
| | | | | 382/103 |
| 2012/0224069 | A1* | 9/2012 | Aoki | G01B 11/026 |
| | | | | 348/187 |
| 2013/0250068 | A1* | 9/2013 | Aoki | G06T 7/85 |
| | | | | 348/47 |
| 2013/0266207 | A1* | 10/2013 | Zhang | H04N 13/0007 |
| | | | | 382/154 |
| 2013/0335259 | A1* | 12/2013 | Yasugi | G01S 13/867 |
| | | | | 342/52 |
| 2014/0133699 | A1* | 5/2014 | Guan | G06K 9/00798 |
| | | | | 382/103 |
| 2015/0116462 | A1* | 4/2015 | Makabe | B60R 1/002 |
| | | | | 348/47 |

* cited by examiner

ROAD SURFACE GRADIENT DETECTION DEVICE

CROSS REFERENCE TO RELATED APPLICATION

This application claims priority from Japanese Patent Application No. 2015-084936 filed on Apr. 17, 2015, the disclosure of which is incorporated herein by reference in its entirety.

BACKGROUND

1. Field

Apparatuses and methods consistent with exemplary embodiments relate to a road surface gradient detection device which detects a road surface gradient from a captured image of the surroundings of a vehicle.

2. Related Art

Japanese Unexamined Patent Application Publication No. 9-325026 is technical literature relating to a device for detecting a road surface gradient from a captured image of the surroundings of a vehicle. More specifically, Japanese Unexamined Patent Application Publication No. 9-325026 describes a road surface gradient detection method which detects a gradient angle of a road surface by calculating the parallax of an image area including a white line portion from a captured image of a stereo camera and determining height information from the calculated parallax of the image area.

SUMMARY

A semi global matching (SGM) method is a method of calculating the parallax of the image area from a captured image of the stereo camera. However, in the SGM method, for a road surface with fewer image features, there is a problem in that parallax cannot be calculated with sufficient accuracy. In the detection method of a road surface gradient, the image area including the white line portion is used to increase the accuracy of calculating the parallax and to improve the accuracy of detecting a road surface gradient. However, this detection method cannot be applied to a case where a white line on a road surface is too blurred to be recognized or when a white line does not exist on a road surface, and thus the improvement of the accuracy of detecting a road surface gradient has been limited.

Accordingly, there is a need for a road surface gradient detection device capable of improving the accuracy of detecting a road surface gradient even when a white line is not included in a captured image.

According to an aspect of an exemplary embodiment, a road surface gradient detection device which detects a road surface gradient based on parallax information obtained from a captured image of the surroundings of a vehicle captured by an in-vehicle camera is provided. The road surface gradient detection device includes an image area setting unit configured to divide a captured image to set a plurality of image areas, a coordinate recognition unit configured to recognize coordinates of a pixel range corresponding to an image area of the plurality of image areas, a parallax calculation unit configured to calculate a parallax of the pixel range based on the parallax information of the captured image, a luminance calculation unit configured to calculate a luminance of the pixel range based on luminance information of the captured image, a weighting setting unit configured, based on the luminance of the pixel range and the coordinates of the pixel range, to set a weight of the pixel range to a first value when the luminance difference between the pixel range and an adjacent pixel range is less than a first threshold value, and configured, based on the luminance of the pixel range and the coordinates of the pixel range, to set the weight of the pixel range to a second value greater than the first value when the luminance difference between the pixel range and the adjacent pixel range is equal to or greater than the first threshold value, a representative height calculation unit configured to calculate a representative parallax of the image area and a representative height of the image area based on the parallax of the pixel range, the coordinates of the pixel range, and a magnitude of the weight of the pixel range, and a road surface gradient detection unit configured to detect a road surface gradient from the captured image based on the representative parallax of the image area and the representative height of the image area.

According to an aspect of an exemplary embodiment, since the representative height of the image area is calculated using the weighting of the pixel range set according to the luminance difference from the adjacent pixel range, it is possible to calculate the representative height with excellent accuracy compared to the related art in which the representative height of the image area is calculated without consideration of the luminance difference. In addition, with this road surface gradient detection device, it is possible to reflect weighting if a luminance difference occurs even in a state where a white line on a road surface is too blurred to be recognized compared to the related art in which a road surface gradient is detected only in an image area including a white line.

According to an aspect of an exemplary embodiment, the road surface gradient detection device may reflect weighting even when a luminance difference occurs due to unevenness of a road surface or a manhole of a road surface in addition to a white line. Accordingly, since it is possible to calculate a representative height using the weighting of a pixel range set according to a luminance difference with excellent accuracy even when a white line is not included in a captured image, it is possible to improve the accuracy of detecting a road surface gradient.

According to an aspect of an exemplary embodiment, the road surface gradient detection device may further include a stereoscopic object detection unit configured to detect a stereoscopic object included in the captured image, and the image area setting unit may be configured to set the plurality of image areas so as not to include pixels constituting the stereoscopic object.

According to an aspect of an exemplary embodiment, the road surface gradient detection device may exclude pixels constituting a stereoscopic object, such as another vehicle, from an image area as a target of road surface gradient detection. Accordingly, it may be possible to suppress erroneous setting of weighting by the influence of a luminance difference due to a stereoscopic object in a captured image and degradation of the accuracy of detecting a road surface gradient.

According to an aspect of an exemplary embodiment, the representative height calculation unit may calculate a height of each pixel range based on the parallax of the pixel range and the coordinates of each pixel range, may add the magnitude of the weight of pixel range to a pixel range having a same height in the image area, and may calculate the height having a greatest addition value of the weight as the representative height of the image area.

According to an aspect of an exemplary embodiment, since the magnitude of the weighting of the pixel ranges having the same height in each image area is added, and the height having the greatest addition value of the weighting is calculated as the representative height of the image area, and the road surface gradient detection device may calculate a representative height with excellent accuracy compared to the related art in which the average value of the parallax of the image ranges in the image area is set as a representative height.

According to an aspect of an exemplary embodiment, the representative height calculation unit may add the magnitude of the weight of the pixel range to a pixel range having a same parallax in the image area and may calculate a parallax having a greatest addition value of the weight as the representative parallax of the image area.

According to an aspect of an exemplary embodiment, the magnitude of the weighting of the pixel ranges having the same parallax in the image area may be added, and the parallax having the greatest addition value of the weighting may be calculated as the representative parallax of the image area. Thus, the road surface gradient detection device may calculate representative parallax with excellent accuracy compared to a method in which the average value of the parallax of the image ranges in the image area is set as representative parallax.

According to an aspect of an exemplary embodiment, a road surface gradient detection device is provided. The road surface gradient detection device includes: at least one memory comprising computer executable instructions; and at least one processor configured to read and execute the computer executable instructions, the computer executable instructions causing the at least one processor to perform: determining coordinates of a pixel range corresponding to an image area from among a plurality of image areas of a captured image; calculating a parallax of the pixel range based on the parallax information of the captured image; calculating a luminance of the pixel range based on luminance information of the captured image; based on the luminance of the pixel range and the coordinates of the pixel range, setting a weight of the pixel range to a first value when the luminance difference between the pixel range and an adjacent pixel range is less than a first threshold value and setting the weight of the pixel range to a second value greater than the first value when the luminance difference between the pixel range and the adjacent pixel range is equal to or greater than the first threshold value; calculating a representative parallax of the image area and a representative height of the image area based on the parallax of the pixel range, the coordinates of the pixel range, and a magnitude of the weight of the pixel range; and detecting a road surface gradient from the captured image based on the representative parallax of the image area and the representative height of the image area.

The computer executable instructions may further cause the at least one processor to perform: detecting a stereoscopic object included in the captured image; and setting the plurality of image areas so as not to include pixels constituting the stereoscopic object.

The calculating the representative height of the image area may include calculating a height of the pixel range based on the parallax of the pixel range and the coordinates of the pixel range, adding the magnitude of the weight of the pixel range to a pixel range having a same height in the image area, and calculating the height having a greatest addition value of the weight as the representative height of the image area.

The calculating the representative parallax of the image area may include adding the magnitude of the weight of the pixel range to a pixel range having a same parallax in the image area and calculating a parallax having a greatest addition value of the weight as the representative parallax of the image area.

According to an aspect of an exemplary embodiment, a road surface gradient detection method is provided. The method includes: determining coordinates of a pixel range corresponding to an image area from among a plurality of image areas of a captured image; calculating a parallax of the pixel range based on the parallax information of the captured image; calculating a luminance of the pixel range based on luminance information of the captured image; based on the luminance of the pixel range and the coordinates of the pixel range, setting a weight of the pixel range to a first value when the luminance difference between the pixel range and an adjacent pixel range is less than a first threshold value and setting the weight of the pixel range to a second value greater than the first value when the luminance difference between the pixel range and the adjacent pixel range is equal to or greater than the first threshold value; calculating a representative parallax of the image area and a representative height of the image area based on the parallax of the pixel range, the coordinates of the pixel range, and a magnitude of the weight of the pixel range; and detecting a road surface gradient from the captured image based on the representative parallax of the image area and the representative height of the image area.

The method may further include: detecting a stereoscopic object included in the captured image; and setting the plurality of image areas so as not to include pixels constituting the stereoscopic object.

The calculating the representative height of the image area may include calculating a height of the pixel range based on the parallax of the pixel range and the coordinates of the pixel range, adding the magnitude of the weight of the pixel range to a pixel range having a same height in the image area, and calculating the height having a greatest addition value of the weight as the representative height of the image area.

The calculating the representative parallax of the image area may include adding the magnitude of the weight of the pixel range to a pixel range having a same parallax in the image area and calculating a parallax having a greatest addition value of the weight as the representative parallax of the image area.

As described above, according to an aspect of an exemplary embodiment, the road surface gradient detection device, may improve the accuracy of detecting a road surface gradient even when a white line is not included in a captured image.

DETAILED DESCRIPTION OF EXEMPLARY EMBODIMENTS

Hereinafter, one or more exemplary embodiments will be described with reference to the accompanying drawings.

Figure 1:
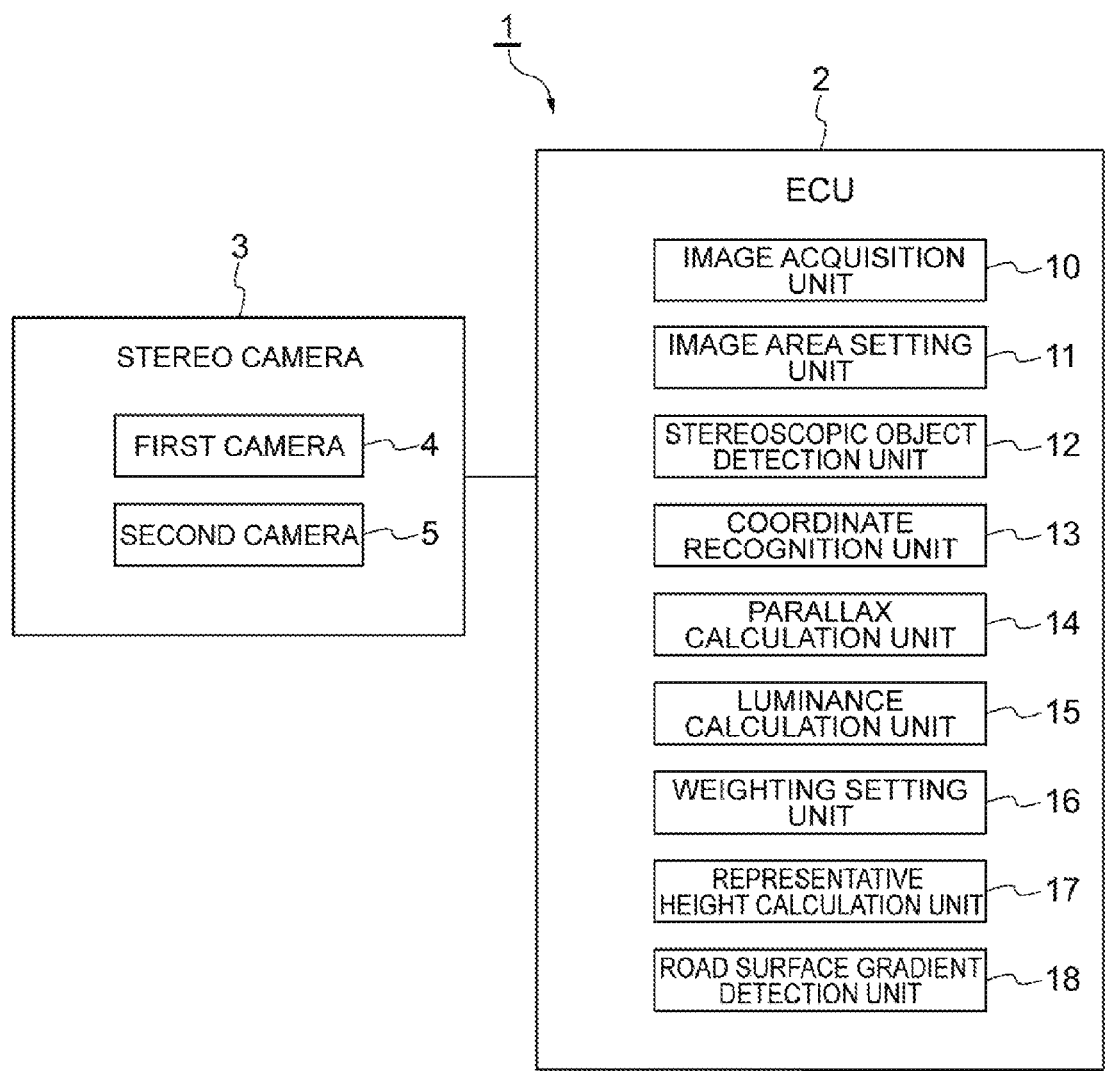
FIG. 1 is a block diagram showing a road surface gradient detection device according to an exemplary embodiment.

A road surface gradient detection device 1 of this exemplary embodiment shown in FIG. 1 is mounted in, for example, a vehicle, such as a passenger vehicle, and detects a road surface gradient based on parallax information obtained from a captured image of the surroundings of the vehicle. The parallax information is, for example, information of the parallax of each pixel of the captured image. The road surface gradient is the gradient of a road surface on which the vehicle can travel. The road surface may include the road surface of a passage of a parking lot and a parking space, in addition to the road surface of the road on which the vehicle travels.

The road surface gradient detection device 1 acquires a captured image with an in-vehicle camera which images the surroundings of the vehicle, and detects a road surface gradient based on parallax information of a parallax image generated from the captured image. The parallax image is an image including the parallax information. In the parallax image, for example, the parallax information is included in each of the pixels constituting the parallax image.

Configuration of Road Surface Gradient Detection Device

As shown in FIG. 1, the road surface gradient detection device 1 includes an electronic control unit (ECU) 2 for detecting a road surface gradient, and a stereo camera (in-vehicle camera) 3.

The ECU 2 is an electronic control unit having a central processing unit (CPU), a read only memory (ROM), a random access memory (RAM), and the like. The ECU 2 loads a program stored in the ROM into the RAM and executes the program on the CPU, thereby executing various kinds of processing. The ECU 2 may include a plurality of electronic control units. At least a part of the functions of the ECU 2 described below may be executed by a computer at a facility, such as an information management center that can perform communication with the vehicle, or a personal digital assistant.

The stereo camera 3 is an image acquisition apparatus which acquires a captured image by imaging the surroundings of the vehicle. The stereo camera 3 may include a first camera 4 and a second camera 5 arranged so as to reproduce binocular parallax. The first camera 4 and the second camera 5 are provided on, for example, the rear side of a windshield of the vehicle, and image in front of the vehicle. The first camera 4 and the second camera 5 may be provided in the side portions or in the rear portion of the vehicle (for example, the rear side of rear glass), and may image sideways or at the rear of the vehicle. The stereo camera 3 transmits the captured image to the ECU 2.

The road surface gradient detection device 1 may include a monocular camera, instead of the stereo camera 3. In the monocular camera, it is also possible to obtain parallax information from a captured image using a method (for example, a method using a time difference at the time of imaging from the monocular camera in the vehicle during traveling).

Next, the functional configuration of the ECU 2 will be described. As shown in FIG. 1, the ECU 2 has an image acquisition unit 10, an image area setting unit 11, a stereoscopic object detection unit 12, a coordinate recognition unit 13, a parallax calculation unit 14, a luminance calculation unit 15, a weighting setting unit 16, a representative height calculation unit 17, and a road surface gradient detection unit 18. The units of the ECU may comprise circuitry configured to perform the respective functions of the units, one or more processors configured to perform the respective functions units, etc.

Figure 2A:
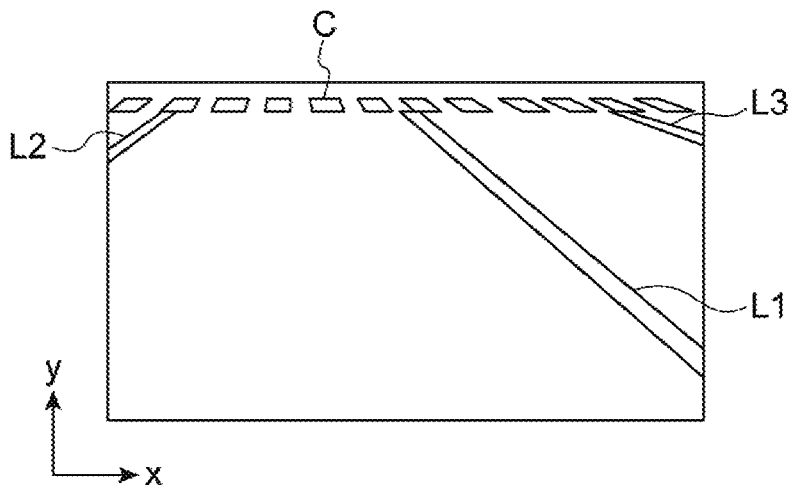
FIG. 2A is a diagram showing a captured image captured by a stereo camera.

The image acquisition unit 10 acquires a captured image of the stereo camera 3. FIG. 2A is a diagram showing a captured image captured by the stereo camera 3. FIG. 2A shows a captured image captured in front of the vehicle. In FIG. 2A, white lines (lane boundary line, vehicle traffic lane boundary line, and the like) L1 and L2 forming a traveling lane of the vehicle, a white line L3 forming an adjacent lane along with the white line L1, and a pedestrian crossing C are shown. In FIG. 2A, an x-y coordinate system of a captured image is shown. The x coordinate is the coordinate (transverse coordinate) in a transverse direction of the captured image, and the y coordinate is the coordinate (longitudinal coordinate) in a longitudinal direction of the captured image. The x coordinate and the y coordinate are set, for example, in units of pixels constituting the captured image. The xy coordinate system is set, for example, with a pixel A at a lower left corner of the captured image as the origin (x,y: 0,0).

The image acquisition unit 10 acquires parallax information by stereo image processing or the like, for example, based on a captured image of the first camera 4 and a captured image of the second camera 5 in the stereo camera 3. The image acquisition unit 10 acquires luminance information based on the captured image of the first camera 4 and the captured image of the second camera 5 in the stereo camera 3. The luminance information is, for example, information of luminance of each pixel of the captured image.

The image acquisition unit 10 may detect a lane boundary of a traveling lane of the vehicle based on the captured image of the stereo camera 3. The image acquisition unit 10 may perform white line recognition (recognition of the white lines L1 and L2), for example, by subjecting the captured image to image processing (for example, edge detection processing). In this case, the image acquisition unit 10 functions as a lane boundary detection unit.

Figure 2B:
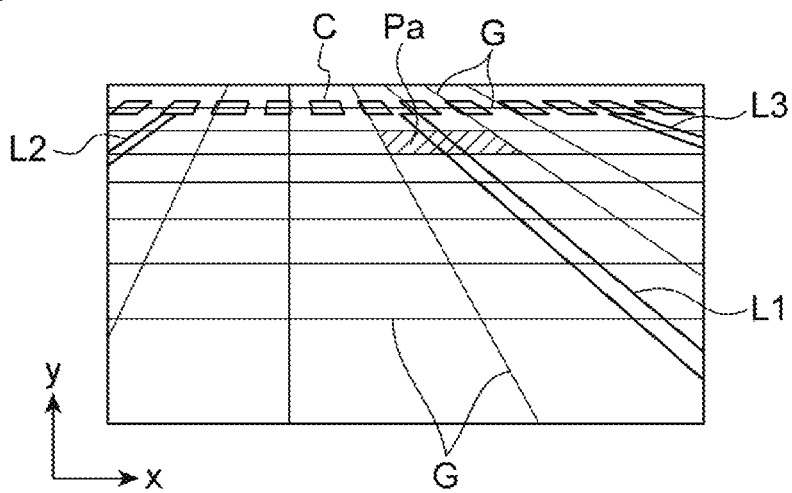
FIG. 2B is a diagram showing a captured image in which a plurality of image areas are set.

The image area setting unit 11 divides the captured image of the stereo camera 3 to set a plurality of image areas. The image areas are areas formed by dividing the captured image. FIG. 2B is a diagram showing a captured image in which a plurality of image areas are set. In FIG. 2B, a grid G dividing the captured image and image areas Pa formed by the grid G are shown. The transverse lines of the grid G shown in FIG. 2B are a plurality of lines parallel to the transverse direction (vehicle width direction) of the captured image. The longitudinal lines of the grid G are a plurality of lines which converge toward a vanishing point in the captured image. As shown in FIG. 2B, the image area setting unit 11 divides the captured image into a plurality of image areas, for example, in a trapezoidal shape in which the transverse width of the image area becomes small from the lower side of the captured image (that is, the front side of the vehicle) toward the upper side. The image area setting unit 11 sets the image areas by applying a grid G set in advance to the captured image, for example, based on the coordinates of the captured image.

The grid G and the image areas shown in FIG. 2B are examples. However, the grid G and a method of dividing the image areas are not particularly limited to these examples. The image area setting unit 11 may set rectangular or square image areas, for example, using a grid G having transverse lines parallel to the transverse direction of the captured image and longitudinal lines parallel to the longitudinal direction of the captured image.

Figure 2C:
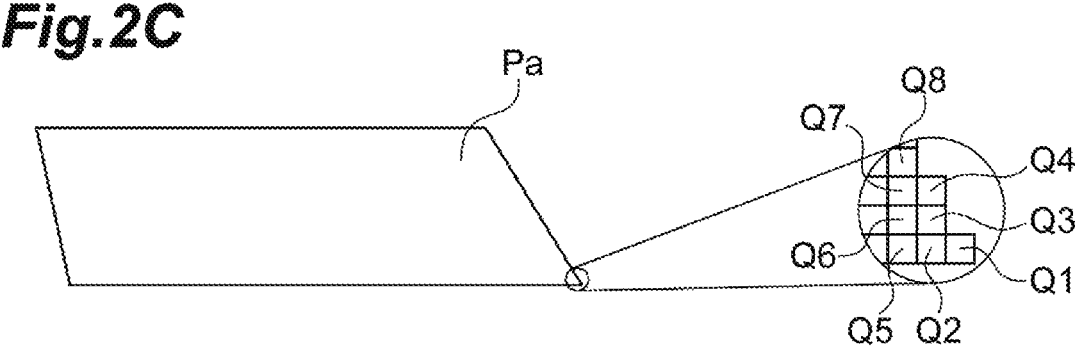
FIG. 2C is a diagram showing a plurality of pixel ranges constituting an image area.

Subsequently, FIG. 2C is a diagram showing a plurality of pixel ranges Q1 to Q8 constituting the image area Pa. Each of the pixel ranges is a range having a single pixel or a range having a plurality of pixels on the captured image. For example, each of the pixel ranges Q1 to Q8 shown in FIG. 2C is a range having a single pixel. The pixel ranges become the ranges having the same number of pixels and the same shape in the entire image area. A plurality of pixel ranges are collected to form the image area. In other words, the image area is divided into a plurality of pixel ranges. When the pixel range has a plurality of pixels, the image area setting unit 11 sets the image areas and a plurality of pixel ranges constituting each of the image areas. Similarly to the image area, the image area setting unit 11 sets a plurality of pixel ranges using a grid set in advance.

The image area setting unit 11 may set the image areas based on the detection result of the stereoscopic object detection unit 12 described below. For example, when the stereoscopic object detection unit 12 detects a stereoscopic object, the image area setting unit 11 sets the image areas so as not to include the pixels constituting the stereoscopic object on the captured image. With this, the road surface gradient detection device 1 avoids degradation of the accuracy of detecting a road surface gradient by the influence of a luminance difference of each image range due to a stereoscopic object, such as another vehicle or a utility pole, included in a captured image.

The image area setting unit 11 may set image areas for a portion set in advance in a captured image. For example, when the image acquisition unit 10 detects a lane boundary of the traveling lane of the vehicle, the image area setting unit 11 may set the image areas for a portion of the traveling lane in a captured image. With this, the road surface gradient detection device 1 avoids degradation of the accuracy of detecting road surface gradient by the influence of a luminance difference due to another vehicle or a utility pole other than the traveling lane.

The stereoscopic object detection unit 12 detects a stereoscopic object included in the captured image, for example, based on the captured image of the stereo camera 3. The stereoscopic object may be, for example, another vehicle (four-wheeled vehicle or two-wheeled vehicle), or a structure, such as a utility pole or a wall, or a pedestrian. The stereoscopic object detection unit 12 detects a stereoscopic object, for example, based on at least one of the parallax information and luminance information of the captured image recognized by the image acquisition unit 10 by image processing (for example, edge detection processing or pattern recognition processing). For example, when a stereoscopic object included in the captured image is detected, the stereoscopic object detection unit 12 recognizes the pixels constituting the stereoscopic object on the captured image.

When the vehicle includes a radar which detects a stereoscopic object, the stereoscopic object detection unit 12 may detect a stereoscopic object using the detection result of the radar in addition to the captured image of the stereo camera 3. The stereoscopic object detection unit 12 detects a stereoscopic object included in the captured image from the captured image of the stereo camera 3 and the detection result of the radar. When the size of a stereoscopic object on the captured image is equal to or less than a predetermined size, the stereoscopic object detection unit 12 may not detect the object as a stereoscopic object.

Figure 3:
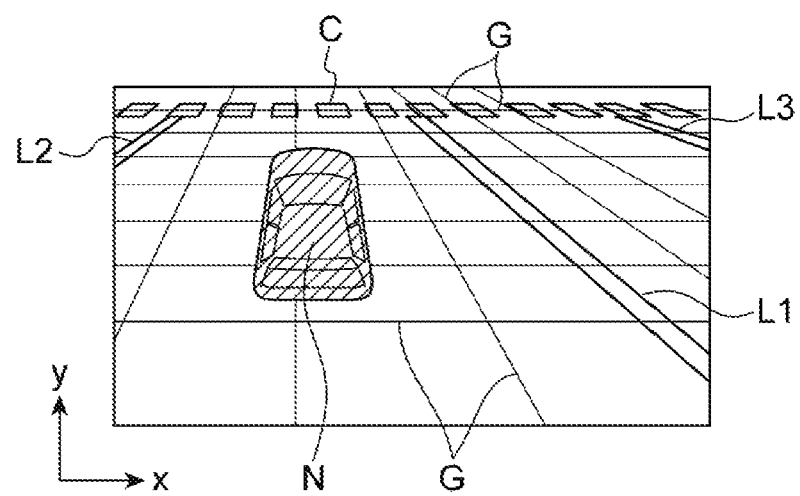
FIG. 3 is a diagram showing a captured image including a stereoscopic object.

FIG. 3 is a diagram showing pixel ranges constituting a stereoscopic object on a captured image. In a situation shown in FIG. 3, the stereoscopic object detection unit 12 detects a preceding vehicle N as a stereoscopic object from the captured image of the stereo camera 3. When the preceding vehicle N is detected as a stereoscopic object, the stereoscopic object detection unit 12 recognizes the pixels constituting the preceding vehicle N on the captured image. When the stereoscopic object detection unit 12 recognizes the pixels constituting the preceding vehicle N on the captured image, the image area setting unit 11 sets the image areas so as not to include the pixels constituting the preceding vehicle N. When each of the pixel ranges has a plurality of pixels, the image area setting unit 11 sets the pixel ranges so as not to include the pixels constituting the preceding vehicle N. The ECU 2 does not necessarily include the stereoscopic object detection unit 12 and the stereoscopic object detection unit 12 may be provided separately or not at all.

The coordinate recognition unit 13 recognizes the coordinates of each pixel range in the captured image. When each of the pixel ranges has a single pixel, the coordinate recognition unit 13 recognizes the coordinates of each pixel as the coordinates of each pixel range. For example, when each of the pixel ranges has a plurality of pixels, the coordinate recognition unit 13 recognizes the coordinates of the center position of the pixel range as the coordinates of the pixel range. The value of the x coordinate of the center position of the pixel range is, for example, a value obtained by dividing the sum of the value of the x coordinate of each pixel constituting the pixel range by the number of pixels constituting the pixel range. Similarly, the value of the y coordinate of the center position of the pixel range is, for example, a value obtained by dividing the sum of the value of the y coordinate of each pixel constituting the pixel range by the number of pixels constituting the pixel range. When each of the pixel range has a plurality of pixels, the coordinate recognition unit 13 may recognize the coordinates other than the coordinates of the center position of the pixel range as the coordinates of the pixel range.

The parallax calculation unit 14 calculates the parallax of each pixel range based on the captured image of the stereo camera 3. The parallax calculation unit 14 calculates the parallax of each pixel range, for example, based on the parallax information (for example, the parallax information in units of pixels) acquired from the captured image by the image acquisition unit 10. When each of the pixel ranges has a single pixel, the parallax calculation unit 14 calculates the parallax of each pixel as the parallax of each pixel range. For example, when each of the pixel ranges has a plurality of pixels, the parallax calculation unit 14 calculates the average value of the parallax of a plurality of pixels constituting the pixel range as the parallax of the pixel range. The parallax calculation unit 14 may calculate the minimum parallax or the maximum parallax among the values of the parallax of a plurality of pixels constituting the pixel range as the parallax of the pixel range.

The luminance calculation unit 15 calculates the parallax of each pixel range based on the luminance information of the captured image of the stereo camera 3. When each of the pixel ranges has a single pixel, the luminance calculation unit 15 calculates the luminance of each pixel as the luminance of each pixel range. For example, when each of the pixel ranges has a plurality of pixels, the luminance calculation unit 15 calculates the average value of the luminance of a plurality of pixels constituting the pixel range as the luminance of the pixel range. The luminance calculation unit 15 may calculate the minimum luminance or the maximum luminance among the values of the luminance of a plurality of pixels constituting the pixel range as the luminance of the pixel range.

The weighting setting unit 16 sets the weighting of each pixel range based on the coordinates of each pixel range recognized by the coordinate recognition unit 13 and the luminance of each pixel range calculated by the luminance calculation unit 15. The weighting setting unit 16 sets the weighting of the pixel range to be greater, for example, when the luminance difference from the adjacent pixel range is greater.

The luminance difference is the difference in luminance between adjacent pixel ranges. For example, when there are a plurality of pixel ranges adjacent to a predetermined pixel range, the weighting setting unit 16 uses the greatest luminance difference among the luminance differences between a plurality of adjacent pixel ranges and the predetermined pixel range as the luminance difference of the predetermined pixel range. The weighting setting unit 16 recognizes the adjacent pixel ranges based on the coordinates of each pixel range recognized by the coordinate recognition unit 13. When there are a plurality of pixel ranges adjacent to the pixel range, the weighting setting unit 16 may set a luminance difference determined by a predetermined method, instead of the greatest luminance difference, as the luminance difference of the pixel range. The weighting setting unit 16 may limit a target of luminance difference comparison to the pixel ranges in the same image area. When the stereoscopic object detection unit 12 recognizes the pixels constituting the stereoscopic object on the captured image, the weighting setting unit 16 may set the pixel ranges other than the pixel ranges including the pixels constituting the stereoscopic object as a target of luminance difference comparison.

The weighting corresponds to, for example, reliability of the parallax of the pixel range. In calculating parallax by subjecting the captured image to image processing, since the accuracy of calculating parallax is high in a pixel range with a high luminance difference due to a white line or the like constituting a road surface, the weighting setting unit 16 sets the weighting of the pixel range to be greater when the luminance difference from the adjacent pixel range is greater. For example, the weighting setting unit 16 sets the weighting of the magnitude proportional to the luminance difference from the adjacent pixel range to the pixel range.

Alternatively, the weighting setting unit 16 sets the weighting of the pixel range to be greater when the luminance difference from the adjacent pixel range is equal to or greater than a first threshold value compared to when the luminance difference from the pixel range is less than the first threshold value. The first threshold value is a threshold value which is appropriately set for the weighting of the pixel range according to the luminance difference. The weighting setting unit 16 may set, for example, a second threshold value greater than the first threshold value and may set the weighting of the pixel range to be greater when the luminance difference from the adjacent pixel range is equal to or greater than the second threshold value compared to when the luminance difference from the adjacent pixel range is less than the second threshold value. Similarly, the weighting setting unit 16 may set three or more threshold values for setting the magnitude of the weighting to the luminance difference in a stepwise manner.

The representative height calculation unit 17 calculates the representative parallax of each image area, for example, based on the parallax of each pixel range calculated by the parallax calculation unit 14. The representative parallax is used as representative (typical) parallax of an image area having a plurality of pixel ranges. The representative parallax is parallax as a reference of an image area. The representative height calculation unit 17 calculates the average value of the parallax of a plurality of pixel ranges constituting an image area as representative parallax. The representative height calculation unit 17 may calculate an intermediate value between the maximum value and the minimum value of the parallax of a plurality of pixel ranges constituting an image area as representative parallax.

The representative height calculation unit 17 may calculate the representative parallax of each image area based on the magnitude of the weighting of each pixel range set by the weighting setting unit 16 in addition to the parallax of each pixel range. A mode in this case will be described below.

The representative height calculation unit 17 calculates the representative height of each image area, for example, based on the parallax of each pixel range calculated by the parallax calculation unit 14, the coordinates of each pixel range recognized by the coordinate recognition unit 13, and the magnitude of the weighting of each pixel range set by the weighting setting unit 16.

The representative height calculation unit 17 calculates the height of each pixel range, for example, based on the parallax of each pixel range calculated by the parallax calculation unit 14 and the coordinates of each pixel range recognized by the coordinate recognition unit 13. The representative height calculation unit 17 calculates the height of each pixel range, for example, based on the parallax of each pixel range and the longitudinal coordinate of each pixel range by using one or more methods (for example, a method using a predetermined calculation expression). The representative height calculation unit 17 adds the magnitude of the weighting of the pixel ranges having the same height in the image area based on the height of each pixel range and the magnitude of the weighting of each pixel range set by the weighting setting unit 16. For example, the representative height calculation unit 17 calculates the height having the greatest addition value of the weighting in the image area as the representative height of the image area.

Figure 4A:
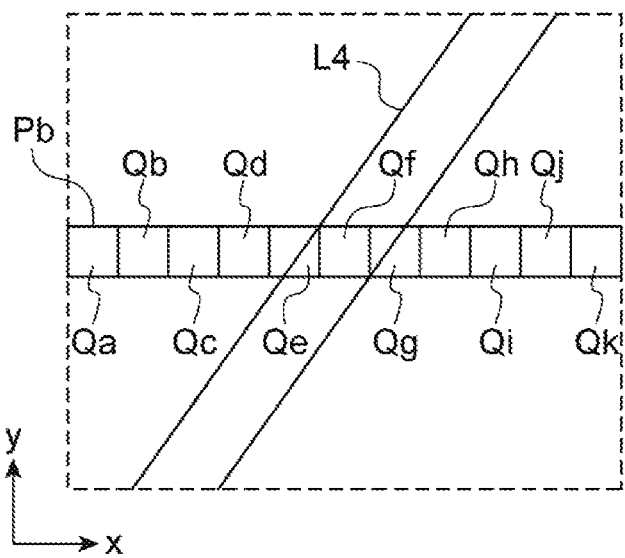
FIG. 4A is a diagram showing an image area set in a captured image of a road surface different from FIG. 2A.

Hereinafter, the calculation of the representative height using the weighting will be described. FIG. 4A is a diagram showing an image area set in a captured image of a road surface different from FIG. 2A. FIG. 4A shows an image area Pb set so as to include a part of a white line L4. In the captured image shown in FIG. 4A, other than the white line L4 is a traveling road surface on which the vehicle travels. The image area Pb is constituted of 11 pixel ranges Qa to Qk with the common longitudinal coordinate on the captured image. It is assumed that each of the pixel ranges Qa to Qk is a pixel range having a single pixel.

Figure 4B:
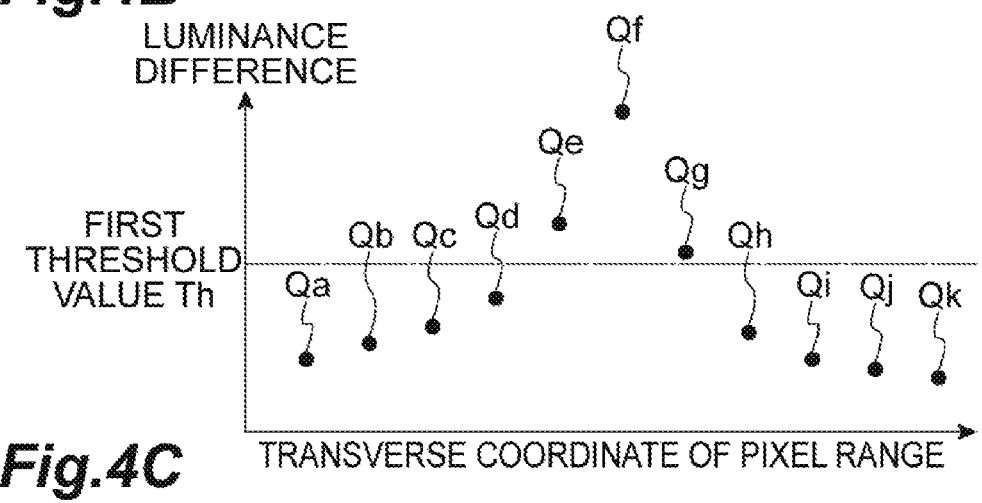
FIG. 4B is a graph showing the relationship between a luminance difference and a transverse coordinate of a pixel range.

FIG. 4B is a graph showing the relationship between a luminance difference and a transverse coordinate of a pixel range. FIG. 4B shows a luminance difference and a first threshold value Th in the pixel ranges Qa to Qk. For ease of understanding, only the luminance difference from the adjacent pixel range in the image area Pb is focused. As shown in FIGS. 4A and 4B, for example, the luminance of the image range Qa only including the traveling road surface of the vehicle has a small difference (luminance difference) from the luminance of the image range Qb, similarly, only including the traveling road surface. The luminance of the image range Qe including a part of the white line L4 has a great difference (luminance difference) from the luminance of the image range Qd only including the traveling road surface. In FIG. 4B, the luminance difference of the image range Qf only including the white line L4 is the greatest.

The weighting setting unit 16 sets the weighting of each pixel range according to the luminance difference shown in FIG. 4B. When the luminance difference of the pixel range is equal to or greater than the first threshold value Th, the weighting setting unit 16 sets the weighting of the pixel range to be greater compared to when the luminance difference of the pixel range is less than the first threshold value Th. Specifically, the weighting setting unit 16 sets the weighting to be greater to the pixel ranges Qe, Qf, and Qg having the luminance difference equal to or greater than the first threshold value Th compared to the pixel ranges Qa to Qd and Qh to Qk having the luminance difference less than the first threshold value Th.

The representative height calculation unit 17 calculates the heights of the pixel ranges Qa to Qk, for example, based on the parallax of the pixel ranges Qa to Qk calculated by the parallax calculation unit 14 and the coordinates of the pixel ranges Qa to Qk recognized by the coordinate recognition unit 13. The representative height calculation unit 17 calculates the representative height of the image area Pb based on the heights of the pixel ranges Qa to Qk and the magnitude of the weighting of the pixel ranges Qa to Qk.

Figure 4C:
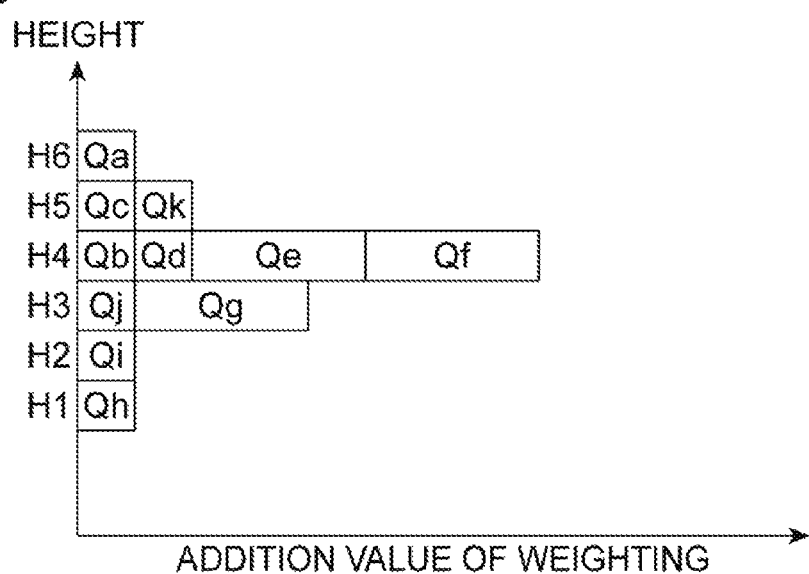
FIG. 4C is a graph showing the relationship between height and an addition value of weighting.

FIG. 4C is a graph showing the relationship between a height and an addition value of weighting. FIG. 4C shows heights H1 to H6. The height becomes greater in order of H1 to H6. When there are the pixel ranges having the same height, the representative height calculation unit 17 adds the magnitude of the weighting of the pixel ranges having the same height for each height. A case where the heights are the same is not limited to a case where the heights of a plurality of pixel ranges completely coincide with one another. When the heights of a plurality of pixel ranges are included within a predetermined range (for example, ±0.5 cm) with respect to a reference height set at a predetermined interval (for example, 1 cm), the representative height calculation unit 17 may handle the heights of the pixel ranges to be the same as the reference height. H1 to H6 shown in FIG. 4C correspond to the reference height.

In FIG. 4C, the height of the pixel range Qa is the same as the height H6. The heights of the pixel ranges Qc and Qk are the same as the height H5. The heights of the pixel ranges Qb, Qd, Qe, and Qf are the same as the height H5. The heights of the pixel ranges Qj and Qg are the same as the height H3. The height of the pixel range Qi is the same as the height H2. The height of the pixel range Qk is the same as the height H1. As shown in FIG. 4C, the addition value of the weighting increases when the number of pixel ranges having the same height is greater. The addition value of the weighting increases when a pixel range in which great weighting is set is included. As described above, greater weighting is set in the pixel ranges Qe, Qf, and Qg in which the luminance difference is equal to or greater than the first threshold value Th compared to the pixel ranges Qa to Qd and Qh to Qk in which the luminance difference is less than the first threshold value Th.

In FIG. 4C, the height H4 becomes a height having the greatest addition value of the weighting. The height H4 includes the heights of the pixel ranges Qe and Qf having great weighting. The height H4 includes the heights of the most four pixel ranges Qb, Qd, Qe, and Qf. For example, the representative height calculation unit 17 calculates the height H4 having the greatest addition value of the weighting in the image area Pb as the representative height of the image area Pb. Similarly, the representative height calculation unit 17 calculates the representative height of each image area in the captured image.

The representative height calculation unit 17 may calculate an intermediate height between the height H4 having the greatest addition value of the weighting and the second greatest height H3 as the representative height. Furthermore, the representative height calculation unit 17 may calculate the average value of the height H4 having the greatest addition value of the weighting, the height H3 having the second greatest addition value of the weighting, and the height H5 having the third greatest addition value of the weighting as the representative height. Other modes may be used.

The road surface gradient detection unit 18 calculates a road surface gradient based on the representative parallax of each image area and the representative height of each image area calculated by the representative height calculation unit 17. The road surface gradient detection unit 18 calculates the road surface gradient as a change in height according to the distance from the stereo camera 3 of the vehicle, for example, by associating the representative parallax and the representative height of each image area. The road surface gradient detection unit 18 may calculate the road surface gradient from the representative parallax and the representative height of each image area.

The road surface gradient detection unit 18 may calculate the road surface gradient based on the representative transverse coordinates of each image area in addition to the representative parallax and the representative height of each image area. In this case, the coordinate recognition unit 13 recognizes the representative transverse coordinates of each image area, for example, based on the coordinates of each pixel range. The coordinate recognition unit 13 recognizes the average value of the transverse coordinates of a plurality of pixel ranges constituting the image area as the representative transverse coordinates of the image area. The representative parallax, the representative height, and the representative transverse coordinates of each image area are called the representative three-dimensional positions of each image area together. That is, road surface gradient detection unit 18 may detect the road surface gradient based on the representative three-dimensional positions of each image area. The road surface gradient detection unit 18 detects the road surface gradient from the representative three-dimensional positions of each image area.

Figure 5:
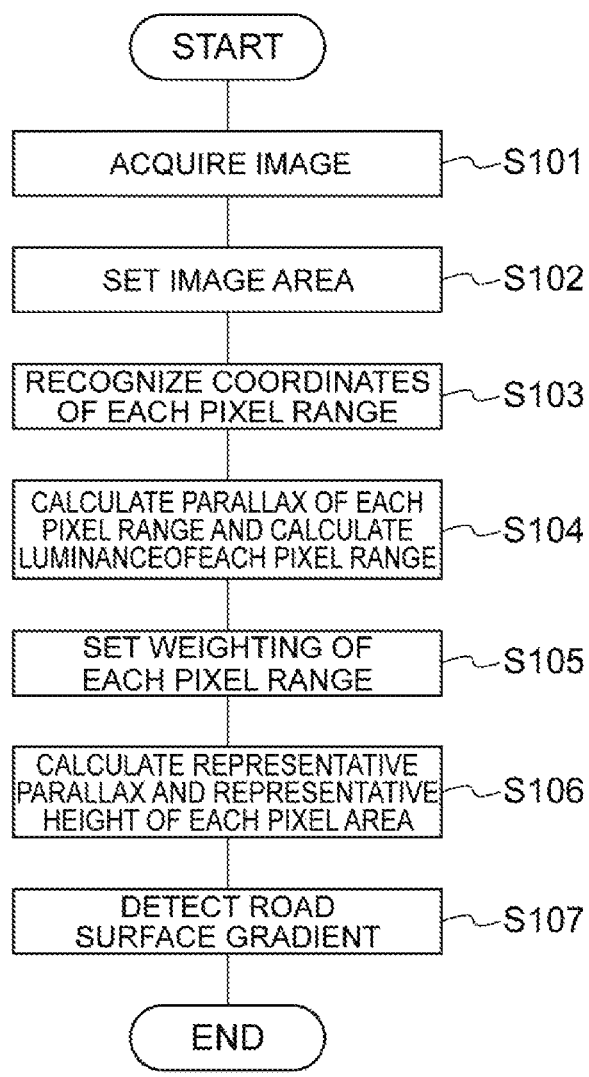
FIG. 5 is a flowchart showing road surface gradient detection control of the road surface gradient detection device of according to an exemplary embodiment.

Road Surface Gradient Detection Control in Road Surface Gradient Detection Device Hereinafter, road surface gradient detection control of the road surface gradient detection device 1 of this embodiment will be described. FIG. 5 is a flowchart showing the road surface gradient detection control of the road surface gradient detection device 1 of this embodiment. The road surface gradient detection device 1 repeats processing of the flowchart shown in FIG. 5, for example, at every time set in advance during traveling of the vehicle.

As shown in FIG. 5, the ECU 2 of the road surface gradient detection device 1 performs, as operation S101, the acquisition of the captured image of the stereo camera 3 by the image acquisition unit 10. The image acquisition unit 10 acquires the parallax information, for example, based on the captured image of the first camera 4 and the captured image of the second camera 5 in the stereo camera 3 by stereo image processing or the like.

In operation S102, the ECU 2 performs the setting of a plurality of image areas for the captured image by the image area setting unit 11. The image area setting unit 11 applies a grid G set in advance to the captured image, thereby setting a plurality of image areas divided by the grid G. When each of the pixel ranges has a plurality of pixels, the image area setting unit 11 sets a plurality of pixel ranges constituting the image area.

At this time, the image area setting unit 11 may set the image areas based on the detection result of the stereoscopic object detection unit 12. When the stereoscopic object detection unit 12 detects a stereoscopic object (for example, preceding vehicle N), the image area setting unit 11 sets the image areas so as not to include the pixels constituting the stereoscopic object on the captured image.

In operation S103, the ECU 2 recognizes the coordinates of each pixel range by the coordinate recognition unit 13. The coordinate recognition unit 13 recognizes the coordinates of each pixel range based on the coordinates of each pixel in the captured image.

In operation S104, the ECU 2 calculates the parallax of each pixel range by the parallax calculation unit 14, and calculates the luminance of each pixel range by the luminance calculation unit 15. The parallax calculation unit 14 calculates the parallax of each pixel range based on the parallax information acquired from the captured image by the image acquisition unit 10. The luminance calculation unit 15 calculates the luminance of each pixel range based on the luminance information acquired from the captured image by the image acquisition unit 10.

In operation S105, the ECU 2 sets the weighting of each pixel range by the weighting setting unit 16. The weighting setting unit 16 calculates the luminance difference between each pixel range and the adjacent pixel range based on the coordinates of each pixel range and the luminance of each pixel range. The weighting setting unit 16 sets the weighting of each pixel range based on the luminance difference of each pixel range. For example, the weighting setting unit 16 sets the weighting of the pixel range to be greater when the luminance difference from the adjacent pixel range is greater. Alternatively, the weighting setting unit 16 sets the weighting of the pixel range to be greater when the luminance difference from the adjacent pixel range is equal to or greater than the first threshold value compared to when the luminance difference from the adjacent pixel range is less than the first threshold value.

In operation S106, the ECU 2 calculates the representative parallax of each image area and the representative height of each image area by the representative height calculation unit 17. The representative height calculation unit 17 calculates the representative parallax of each image area and the representative height of each image area based on the parallax of each pixel range, the coordinates of each pixel range, and the magnitude of the weighting of each pixel range. For example, the representative height calculation unit 17 calculates the average value of the parallax of a plurality of pixel ranges constituting the image area as the representative parallax of the image area. Furthermore, the representative height calculation unit 17 calculates the height of each pixel range, for example, based on the parallax of each pixel range and the longitudinal coordinate of each pixel range, and adds the weighting of the pixel ranges having the same height in the image area. For example, the representative height calculation unit 17 calculates the height having the greatest addition value of the weighting in the image area as the representative height of the image area.

In operation S107, the ECU 2 detects the road surface gradient by the road surface gradient detection unit 18. The road surface gradient detection unit 18 calculates the road surface gradient based on the representative parallax of each image area and the representative height of each image area calculated by the representative height calculation unit 17.

Functional Effects of Road Surface Gradient Detection Device

With the road surface gradient detection device 1 according to an exemplary embodiment described above, since the representative height of the image area is calculated using the weighting of the pixel range set according to the luminance difference from the adjacent pixel range, it is possible to calculate the representative height with excellent accuracy compared to the related art in which the representative height of the image area is calculated without consideration of the luminance difference. With the road surface gradient detection device 1, it is possible to reflect weighting if a luminance difference occurs even in a state where a white line on a road surface is too blurred to be recognized compared to the related art in which a road surface gradient is detected only in an image area including a white line. In the road surface gradient detection device 1, it is possible to reflect weighting even when a luminance difference occurs due to unevenness of a road surface or a manhole of a road surface in addition to a white line. Accordingly, with the road surface gradient detection device 1, since it is possible to calculate a representative height using the weighting of a pixel range set according to a luminance difference with excellent accuracy even when a white line is not included in a captured image, it is possible to improve the accuracy of detecting a road surface gradient.

In the road surface gradient detection device 1 of this embodiment, pixel ranges constituting a stereoscopic object, such as another vehicle, may be excluded from the setting of the weighting of each image range and the calculation of the representative height and the representative parallax. In this case, the road surface gradient detection device 1 can exclude pixels constituting a stereoscopic object, such as another vehicle, from an image area as a target of road surface gradient detection. Accordingly, with the road surface gradient detection device 1, it is possible to suppress erroneous setting of weighting by the influence of a luminance difference due to a stereoscopic object in a captured image and degradation of the accuracy of detecting a road surface gradient.

In the road surface gradient detection device 1, the representative height calculation unit 17 may calculate the height of each pixel range based on the parallax of each pixel range and the coordinates of each pixel range, may add the magnitude of the weighting of the pixel ranges having the same height in the image area, and may calculate the height having the greatest addition value of the weighting as the representative height for each image area. In this case, since the road surface gradient detection device 1 adds the magnitude of the weighting of the pixel ranges having the same height in the image area and calculates the height having the greatest addition value of the weighting as the representative height of the image area, it is possible to calculate a representative height with excellent accuracy compared to the related art in which the average value of the parallax of the image ranges in the image area is set as a representative height.

Although exemplary embodiments have been described, the inventive concept is not limited to the above-described exemplary embodiments. In particular, the exemplary embodiments may be carried out in various forms, in which various modifications and improvements are added based on the knowledge of those skilled in the art, including the above-described exemplary embodiment.

For example, similar to the calculation method of the representative height described above, the representative height calculation unit 17 may calculate the representative parallax of each image area using the magnitude of the weighting of each image range. In this case, the representative height calculation unit 17 calculates the representative parallax of each image area based on the parallax of each pixel range calculated by the parallax calculation unit 14 and the magnitude of the weighting of each pixel range set by the weighting setting unit 16.

The calculation of the representative parallax of each image range using the magnitude of the weighting of each image range will be specifically described referring to the FIGS. 4A to 4C. First, as described in the above-described embodiment, the parallax calculation unit 14 calculates the parallax of the pixel ranges Qa to Qk shown in FIG. 4A based on the parallax information of the captured image. The luminance calculation unit 15 calculates the luminance of the pixel ranges Qa to Qk shown in FIG. 4A based on the luminance information of the captured image. The weighting setting unit 16 sets the weighting of the image ranges Qa to Qk according to the luminance difference of the image ranges Qa to Qk as shown in FIG. 4B. For example, the weighting setting unit 16 sets the weighting to be greater in the pixel ranges Qe, Qf, and Qg in which the luminance difference is equal to or greater than the first threshold value Th compared to the pixel ranges Qa to Qd and Qh to Qk in which the luminance difference is less than the first threshold value Th. The weighting setting unit 16 may set the weighting of the pixel ranges Qa to Qk to be greater when the luminance difference is greater.

The representative height calculation unit 17 calculates the representative parallax of the image area Pb based on the parallax of the pixel ranges Qa to Qk calculated by the parallax calculation unit 14 and the magnitude of the weighting of the pixel ranges Qa to Qk set by the weighting setting unit 16. Hereinafter, description will be provided while the longitudinal coordinate of FIG. 4C is substituted with parallax instead of height.

When there are the pixel ranges having the same parallax, the representative height calculation unit 17 adds the magnitude of the weighting of the pixel ranges having the same parallax. A case where the parallax is the same is not limited to a case where the parallax of a plurality of pixel ranges completely coincides with one another. When the parallax of a plurality of pixel ranges is included within a predetermined range (for example, ±0.25 m) with respect to reference parallax set at a predetermined interval (for example, 0.5 m) in advance, the representative height calculation unit 17 may handle the parallax of the pixel ranges to be the same as the reference parallax.

In this case, for example, the representative height calculation unit 17 calculates the height H4 having the greatest addition value of the weighting in the image area Pb as the representative height of the image area Pb. Similarly, the representative height calculation unit 17 calculates the representative parallax of each image area set in the captured image.

The representative height calculation unit 17 may calculate intermediate parallax between the parallax having the greatest addition value of the weighting and the parallax having the second greatest addition value of the weighting as the representative parallax. The representative height calculation unit 17 may calculate the average value of the parallax having the greatest addition value of the weighting, the parallax having the second greatest addition value of the weighting, and the parallax having the third greatest addition value of the weighting as the representative parallax.

In this case, in the road surface gradient detection device 1, since the magnitude of the weighting of the pixel ranges having the same parallax in the image area is added, and the parallax having the greatest addition value of the weighting is calculated as the representative parallax of the image area, it is possible to calculate representative parallax with excellent accuracy compared to a method in which the average value of the parallax of the image ranges in the image area is set as representative parallax.

In this case, the representative height calculation unit 17 can calculate the representative height of each image area based on the representative parallax of each image area calculated using the magnitude of the weighting of each image range and the coordinates of each image area. The coordinate recognition unit 13 recognizes the coordinates of each image area, for example, based on the coordinates of each pixel range. For example, similar to the recognition of the coordinates of the pixel range when the pixel range has a plurality of pixels, the coordinate recognition unit 13 recognizes the coordinates of the center position of the image area as the coordinates of the image area. The representative height calculation unit 17 calculates the representative height of each image area based on the representative parallax of each image area and the longitudinal coordinate of each image area.

Alternatively, the representative height calculation unit 17 may calculate the representative height of each image area in the same manner as in the above-described exemplary embodiment.

Even when the stereoscopic object detection unit 12 detects a stereoscopic object included in a captured image, the road surface gradient detection device 1 may set the image areas including the pixels constituting the stereoscopic object on the captured image. In this case, the road surface gradient detection device 1 can suppress the influence of the luminance difference due to the stereoscopic object, for example, by setting the pixel ranges other than the pixel ranges including the pixels constituting the stereoscopic object on the captured image as a target of luminance difference comparison in the weighting setting unit 16. In addition, the road surface gradient detection device 1 may calculate the representative parallax of each image area and the representative height of each image area using the pixel ranges other than the pixel ranges including the pixels constituting the stereoscopic object in the representative height calculation unit 17.

What is claimed is:

1. A road surface gradient detection device, the road surface gradient detection device comprising:
   an image area setting unit configured to divide a captured image to set a plurality of image areas;
   a coordinate recognition unit configured to recognize coordinates of a pixel range corresponding to an image area of the plurality of image areas;
   a parallax calculation unit configured to calculate a parallax of the pixel range based on the parallax information of the captured image;
   a luminance calculation unit configured to calculate a luminance of the pixel range based on luminance information of the captured image;
   a weighting setting unit configured, based on the luminance of the pixel range and the coordinates of the pixel range, to set a weight of the pixel range to a first value when the luminance difference between the pixel range and an adjacent pixel range is less than a first threshold value, and configured, based on the luminance of the pixel range and the coordinates of the pixel range, to set the weight of the pixel range to a second value greater than the first value when the luminance difference between the pixel range and the adjacent pixel range is equal to or greater than the first threshold value;

a representative height calculation unit configured to calculate a representative parallax of the image area and a representative height of the image area based on the parallax of the pixel range, the coordinates of the pixel range, and a magnitude of the weight of the pixel range; and a road surface gradient detection unit configured to detect a road surface gradient from the captured image based on the representative parallax of the image area and the representative height of the image area.

2. The road surface gradient detection device according to claim 1, further comprising:

a stereoscopic object detection unit configured to detect a stereoscopic object included in the captured image, wherein the image area setting unit is configured to set the plurality of image areas so as not to include pixels constituting the stereoscopic object.

3. The road surface gradient detection device according to claim 1, wherein the representative height calculation unit is configured to calculate a height of the pixel range based on the parallax of the pixel range and the coordinates of the pixel range, add the magnitude of the weight of the pixel range to a pixel range having a same height in the image area, and calculate the height having a greatest addition value of the weight as the representative height of the image area.

4. The road surface gradient detection device according to claim 1, wherein the representative height calculation unit is configured to add the magnitude of the weight of the pixel range to a pixel range having a same parallax in the image area and calculate a parallax having a greatest addition value of the weight as the representative parallax of the image area.

5. The road surface gradient detection device according to claim 2, wherein the representative height calculation unit is configured to calculate a height of the pixel range based on the parallax of the pixel range and the coordinates of the pixel range, add the magnitude of the weight of the pixel range to a pixel range having a same height in the image area, and calculate the height having a greatest addition value of the weight as the representative height of the image area.

6. The road surface gradient detection device according to claim 2, wherein the representative height calculation unit is configured to add the magnitude of the weight of the pixel range to a pixel range having a same parallax in the image area and calculate a parallax having a greatest addition value of the weight as the representative parallax of the image area.

7. The road surface gradient detection device according to claim 3, wherein the representative height calculation unit is configured to add the magnitude of the weight of the pixel range to a pixel range having a same parallax in the image area and calculate a parallax having a greatest addition value of the weight as the representative parallax of the image area.

8. The road surface gradient detection device according to claim 5, wherein the representative height calculation unit is configured to add the magnitude of the weight of the pixel range to a pixel range having a same parallax in the image area and calculate a parallax having a greatest addition value of the weight as the representative parallax of the image area.

9. A road surface gradient detection device, the road surface gradient detection device comprising:

at least one memory comprising computer executable instructions; and at least one processor configured to read and execute the computer executable instructions, the computer executable instructions causing the at least one processor to perform:

determining coordinates of a pixel range corresponding to an image area from among a plurality of image areas of a captured image;

calculating a parallax of the pixel range based on the parallax information of the captured image;

calculating a luminance of the pixel range based on luminance information of the captured image;

based on the luminance of the pixel range and the coordinates of the pixel range, setting a weight of the pixel range to a first value when the luminance difference between the pixel range and an adjacent pixel range is less than a first threshold value and setting the weight of the pixel range to a second value greater than the first value when the luminance difference between the pixel range and the adjacent pixel range is equal to or greater than the first threshold value;

calculating a representative parallax of the image area and a representative height of the image area based on the parallax of the pixel range, the coordinates of the pixel range, and a magnitude of the weight of the pixel range; and detecting a road surface gradient from the captured image based on the representative parallax of the image area and the representative height of the image area.

10. The road surface gradient detection device according to claim 9, wherein the computer executable instructions further cause the at least one processor to perform:

detecting a stereoscopic object included in the captured image; and setting the plurality of image areas so as not to include pixels constituting the stereoscopic object.

11. The road surface gradient detection device according to claim 9, wherein the calculating the representative height of the image area comprises calculating a height of the pixel range based on the parallax of the pixel range and the coordinates of the pixel range, adding the magnitude of the weight of the pixel range to a pixel range having a same height in the image area, and calculating the height having a greatest addition value of the weight as the representative height of the image area.

12. The road surface gradient detection device according to claim 9, wherein the calculating the representative parallax of the image area comprises adding the magnitude of the weight of the pixel range to a pixel range having a same parallax in the image area and calculating a parallax having a greatest addition value of the weight as the representative parallax of the image area.

13. A road surface gradient detection method, the method comprising:
   determining coordinates of a pixel range corresponding to an image area from among a plurality of image areas of a captured image;
   calculating a parallax of the pixel range based on the parallax information of the captured image;
   calculating a luminance of the pixel range based on luminance information of the captured image;
   based on the luminance of the pixel range and the coordinates of the pixel range, setting a weight of the pixel range to a first value when the luminance difference between the pixel range and an adjacent pixel range is less than a first threshold value and setting the weight of the pixel range to a second value greater than the first value when the luminance difference between the pixel range and the adjacent pixel range is equal to or greater than the first threshold value;
   calculating a representative parallax of the image area and a representative height of the image area based on the parallax of the pixel range, the coordinates of the pixel range, and a magnitude of the weight of the pixel range; and
   detecting a road surface gradient from the captured image based on the representative parallax of the image area and the representative height of the image area.

14. The road surface gradient detection method according to claim 13, further comprising:
   detecting a stereoscopic object included in the captured image; and
   setting the plurality of image areas so as not to include pixels constituting the stereoscopic object.

15. The road surface gradient detection device according to claim 13,
   wherein the calculating the representative height of the image area comprises calculating a height of the pixel range based on the parallax of the pixel range and the coordinates of the pixel range, adding the magnitude of the weight of the pixel range to a pixel range having a same height in the image area, and calculating the height having a greatest addition value of the weight as the representative height of the image area.

16. The road surface gradient detection device according to claim 13,
   wherein the calculating the representative parallax of the image area comprises adding the magnitude of the weight of the pixel range to a pixel range having a same parallax in the image area and calculating a parallax having a greatest addition value of the weight as the representative parallax of the image area.

* * * * *